US012614956B2

(12) United States Patent
Mitsui et al.

(10) Patent No.: US 12,614,956 B2
(45) Date of Patent: Apr. 28, 2026

(54) MANUFACTURING METHOD FOR LAMINATED IRON CORE AND LAMINATED IRON CORE

(71) Applicant: MITSUI HIGH-TEC, INC., Fukuoka (JP)

(72) Inventors: Yasunari Mitsui, Fukuoka (JP); Yusuke Hasuo, Fukuoka (JP); Shinichiro Ono, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 268 days.

(21) Appl. No.: 18/603,618

(22) Filed: Mar. 13, 2024

(65) Prior Publication Data

US 2024/0322658 A1 Sep. 26, 2024

(30) Foreign Application Priority Data

Mar. 20, 2023 (JP) ................................. 2023-044045

(51) Int. Cl.
H02K 15/02 (2025.01)
H02K 1/06 (2006.01)

(52) U.S. Cl.
CPC ............... H02K 15/02 (2013.01); H02K 1/06 (2013.01); H02K 2215/00 (2021.08)

(58) Field of Classification Search
CPC ....... H02K 1/06; H02K 15/02; H02K 2215/00
USPC .................................................. 310/216.004
See application file for complete search history.

(56) References Cited

U.S. PATENT DOCUMENTS

| | | | | |
|---|---|---|---|---|
| 12,483,077 | B2 * | 11/2025 | Umeda ................... | B23P 19/02 |
| 2017/0005551 | A1 * | 1/2017 | Sasaki .................... | H02K 15/02 |
| 2017/0237320 | A1 * | 8/2017 | Urabe .................. | H02K 15/022 29/596 |
| 2017/0338724 | A1 * | 11/2017 | Arakawa .............. | H02K 15/022 |
| 2018/0166214 | A1 * | 6/2018 | Amano .................... | H02K 1/27 |
| 2018/0212478 | A1 * | 7/2018 | Nakamura ........... | H02K 15/022 |
| 2018/0358871 | A1 * | 12/2018 | Hasuo .................... | H02K 15/02 |
| 2019/0109522 | A1 * | 4/2019 | Hasuo .................. | H02K 15/022 |
| 2019/0372439 | A1 * | 12/2019 | Hashimoto ............ | B21D 43/00 |
| 2021/0194336 | A1 * | 6/2021 | Nagasugi ................ | H01F 41/14 |
| 2023/0291287 | A1 * | 9/2023 | Ono ........................ | H02K 1/146 |

(Continued)

FOREIGN PATENT DOCUMENTS

JP 2020-78188 5/2020

*Primary Examiner* — Rashad H Johnson
(74) *Attorney, Agent, or Firm* — Sterne, Kessler, Goldstein & Fox P.L.L.C.

(57) ABSTRACT

A manufacturing method for a laminated iron core, the manufacturing method includes: a punching process of punching a metal sheet to form a plurality of punched members including a first punched member and a second punched member; and a laminating process of forming a laminated body by laminating the plurality of punched members while changing a rotational lamination angle each time one or more punched members are laminated. In the laminating process, the plurality of punched members are laminated such that the rotational lamination angle is the same between the first punched member and the second punched member adjacent to each other in a boundary portion between two or more of the first punched members that are continuously laminated and two or more of the second punched members that are continuously laminated.

8 Claims, 10 Drawing Sheets

(56)　　　　　References Cited

U.S. PATENT DOCUMENTS

| 2023/0307966 A1* | 9/2023 | Umeda | .................... | H02K 1/16 |
| 2024/0322658 A1* | 9/2024 | Mitsui | ..................... | H02K 1/06 |
| 2025/0055328 A1* | 2/2025 | Moriyama | .............. | H02K 1/02 |

* cited by examiner

*FIG. 7B*

| k | ROTATIONAL LAMINATION ANGLE | NUMBER |
|---|---|---|
| 1 | 0° | 100 |
| 2 | 120° | 100 |
| 3 | 240° | 90 |
| 4 | 0° | 110 |
| 5 | 120° | 100 |
| 6 | 240° | 110 |
| 7 | 0° | 90 |
| 8 | 120° | 100 |
| 9 | 240° | 100 |

MANUFACTURING METHOD FOR LAMINATED IRON CORE AND LAMINATED IRON CORE

CROSS-REFERENCE TO RELATED APPLICATIONS

This application is based on and claims priority under 35 USC 119 from Japanese Patent Application No. 2023-044045 filed on Mar. 20, 2023, the contents of which are incorporated herein by reference.

TECHNICAL FIELD

The present disclosure relates to a manufacturing method for a laminated iron core and a laminated iron core.

BACKGROUND ART

Patent Literature 1 discloses a stator of a rotary electric machine including a first laminated core that protrudes in a radial direction and includes a fastening lug for attaching the stator to a case of the rotary electric machine, and a pair of second laminated cores that are fixed by laminating the first laminated core from above and below and that do not include fastening lug.

CITATION LIST

Patent Literature

Patent Literature 1: JP2020-78188A

In manufacturing a laminated iron core, iron core pieces are continuously punched out from a strip-shaped metal sheet, and a plurality of the iron core pieces are laminated to form a laminated body. The laminated body is required to have a lamination thickness within a tolerance corresponding to a thickness of the laminated iron core to be manufactured. However, a plate thickness of the strip-shaped metal sheet is not necessarily uniform, that is, there is a plate thickness deviation, and therefore, when the iron core pieces are simply laminated, the lamination thickness of the laminated body may not fall within the tolerance due to the influence of the plate thickness deviation. In addition, in the laminated iron core (laminated body), there may be portions having different shapes in a lamination direction.

SUMMARY

The present disclosure provides a laminated iron core and a manufacturing method for a laminated iron core that is useful for reducing the influence of a plate thickness deviation and a shape change.

A manufacturing method for a laminated iron core according to an aspect of the present disclosure, the manufacturing method includes: a punching process of punching a metal sheet to form a plurality of punched members including a first punched member having a first shape and a second punched member having a second shape different from the first shape; and a laminating process of forming a laminated body by laminating the plurality of punched members while changing a rotational lamination angle each time one or more punched members are laminated, the rotational lamination angle representing an angle of the punched member in a circumferential direction. In the laminating process, the plurality of punched members are laminated such that the rotational lamination angle is the same between the first punched member and the second punched member adjacent to each other in a boundary portion between two or more of the first punched members that are continuously laminated and two or more of the second punched members that are continuously laminated.

A laminated iron core according to an aspect of the present disclosure includes a laminated body formed by laminating a plurality of punched members including a first punched member having a first shape and a second punched member having a second shape different from the first shape. The laminated body includes a plurality of blocks arranged in a lamination direction and each including one or more punched members. In the laminated body, a rotational lamination angle, which represents an angle of the punched member in a circumferential direction, is different between blocks adjacent to each other among the plurality of blocks, and the rotational lamination angle is the same between the first punched member and the second punched member adjacent to each other in a boundary portion between two or more of the first punched members that are continuously laminated and two or more of the second punched members that are continuously laminated.

According to the present disclosure, it is possible to provide a laminated iron core and a manufacturing method for a laminated iron core that is useful for reducing the influence of a plate thickness deviation and a shape change.

BRIEF DESCRIPTION OF DRAWINGS

FIG. 7B is a table showing an example of information held by a controller.

DESCRIPTION OF EMBODIMENTS

Figure 1:
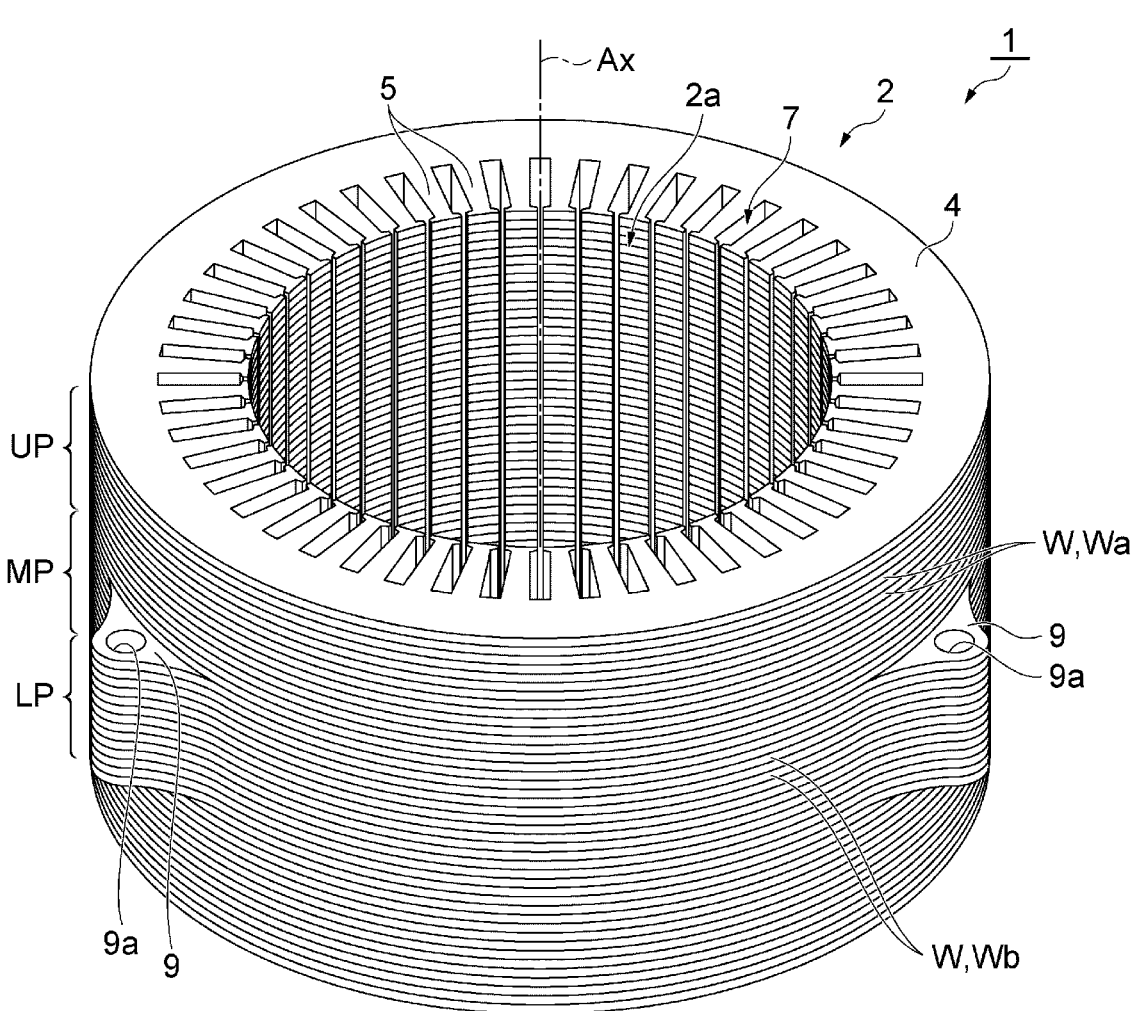
FIG. 1 is a perspective view schematically showing an example of a laminated iron core.

Hereinafter, an embodiment will be described with reference to the drawings. In the description, the same elements or elements having the same functions are denoted by the same reference numerals, and redundant description thereof is omitted.

Configuration of Laminated Iron Core

First, a configuration of a laminated iron core according to the embodiment will be described with reference to FIG. 1, FIG. 2A, and FIG. 2B. A laminated iron core 1 is a laminated iron core for a motor or an intermediate product in a manufacturing process thereof. The laminated iron core 1 is, for example, a core for a stator (stator laminated iron core) as shown in FIG. 1. The stator is formed by attaching windings to the laminated iron core 1 shown in FIG. 1. A motor (electric motor) is formed by combining the stator and a rotor. Hereinafter, the configuration of the laminated iron core 1 will be described with reference to a state in which the laminated iron core 1 is disposed such that a central axis Ax of the laminated iron core 1 is along a vertical direction.

The laminated iron core 1 shown in FIG. 1 includes a laminated body 2. The laminated body 2 is formed by laminating a plurality of punched members W. The laminated body 2 is formed in a cylindrical shape. A through hole 2a extending along the central axis Ax of the laminated iron core 1 is provided in a central portion of the laminated body 2. The through hole 2a extends in a height direction of the laminated body 2. The height direction of the laminated body 2 corresponds to a lamination direction in which the plurality of punched members W are arranged (the lamination direction of the laminated body 2: hereinafter, simply referred to as "lamination direction"). A core for a rotor (rotor laminated iron core) can be disposed in the through hole 2a.

The laminated body 2 (laminated iron core 1) includes a yoke portion 4, a plurality of tooth portions 5, and a plurality of lug portions 9. The yoke portion 4 is a portion formed in a ring shape. The yoke portion 4 may be formed in a circular ring shape. The yoke portion 4 extends along a circumference around the central axis Ax. A width of the yoke portion 4, an inner diameter of the yoke portion 4, and an outer diameter of the yoke portion 4 in a radial direction of a circle centered on the central axis Ax (hereinafter, simply referred to as "radial direction") are set according to the application and performance of the motor.

Each of the plurality of tooth portions 5 is a portion formed to extend from an inner peripheral edge of the yoke portion 4 toward the central axis Ax. Each tooth portion 5 extends along the radial direction. In the laminated iron core 1 shown in FIG. 1, the plurality of tooth portions 5 are formed integrally with the yoke portion 4. The plurality of tooth portions 5 are arranged at substantially equal intervals in a circumferential direction around the central axis Ax (an extending direction of the yoke portion 4: hereinafter, simply referred to as a "circumferential direction"). A slot 7 (space) for arranging a winding is formed between the tooth portions 5 adjacent to each other in the circumferential direction. The number of the plurality of tooth portions 5, a width of the tooth portion 5 in the circumferential direction, and a length of the tooth portion 5 in the radial direction are set according to the application and performance of the motor.

Each of the lug portions 9 protrudes outward in the radial direction from an outer edge of the yoke portion 4 so as to be away from the central axis Ax. The lug portions 9 are arranged at substantially equal intervals in the circumferential direction. The laminated iron core 1 shown in FIG. 1 is provided with three lug portions 9 (see also FIG. 2B). In this case, a center position of one lug portion 9 and a center position of another lug portion 9 are different by 120° in the circumferential direction. Each lug portion 9 is formed with a through hole 9a penetrating the lug portion 9 in the lamination direction. The through holes 9a of the plurality of lug portions 9 function as holes into which bolts for fixing the laminated iron core 1 to a housing of the motor are to be inserted.

The plurality of lug portions 9 are provided in a partial region of the laminated body 2 in the lamination direction. The sizes of the plurality of lug portions 9 in the lamination direction are substantially equal to each other. For example, the plurality of lug portions 9 are provided in a middle portion (about ⅓ region) of the laminated body 2 in the lamination direction. In this case, a portion of the laminated body 2 where the plurality of lug portions 9 are provided is sandwiched from above and below by two portions where the lug portions 9 are not provided.

Each of the plurality of punched members W constituting the laminated body 2 is a plate-shaped body formed by punching a metal sheet MS described later along a predetermined shape. As described above, in the laminated body 2, the presence or absence of the lug portion 9 varies depending on the position in the lamination direction. Therefore, the plurality of punched members W include two types of punched members W having different shapes. Hereinafter, the punched member W constituting a portion where the lug portion 9 is not provided is referred to as a "punched member Wa", and the punched member W constituting a portion where the lug portions 9 are provided is referred to as a "punched member Wb".

When the laminated body 2 is divided in the lamination direction into three regions of an upper portion UP, a middle portion MP, and a lower portion LP, the upper portion UP of the laminated body 2 may include only a plurality of punched members Wa without the punched member Wb. Further, the middle portion MP of the laminated body 2 may be formed of only a plurality of punched members Wb without the punched member Wa, and the lower portion LP of the laminated body 2 may be formed of only a plurality of punched members Wa without the punched member Wb. The upper portion UP, the middle portion MP, and the lower portion LP of the laminated body 2 may have the same size in the lamination direction.

Figure 2A:
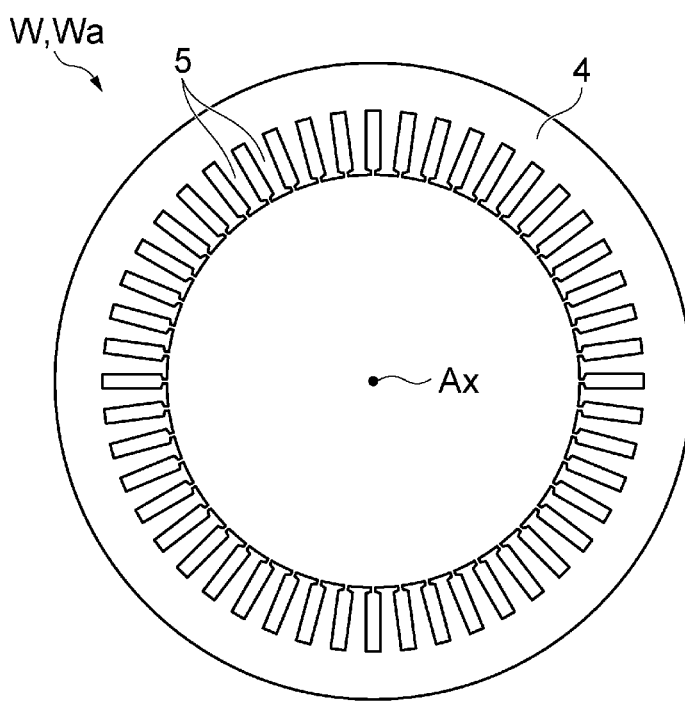
FIGS. 2A and 2B are top views showing examples of a punched member.

As shown in FIG. 2A, the punched member Wa has a shape corresponding to a portion of the laminated body 2 where the lug portions 9 are not provided (the upper portion UP and the lower portion LP of the laminated body 2). The punched member Wa has a portion corresponding to the yoke portion 4 and portions corresponding to the plurality of tooth portions 5, and does not have a portion corresponding to the lug portion 9. In the punched member Wa shown in FIG. 2A, the portion corresponding to the yoke portion 4 and the portion corresponding to the tooth portion 5 are denoted by the same reference numerals as the yoke portion 4 and the tooth portion 5, respectively.

Figure 2B:
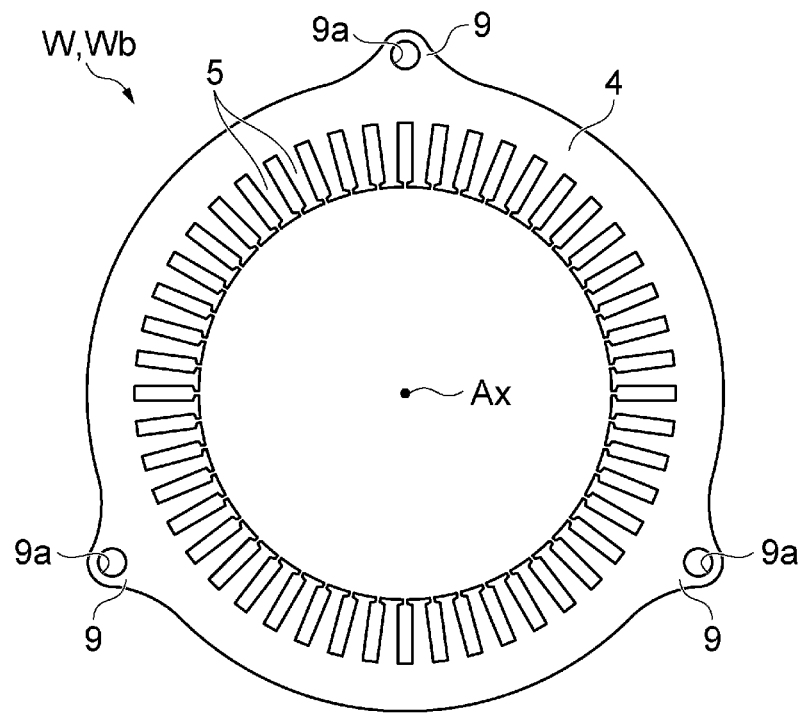

As shown in FIG. 2B, the punched member Wb has a shape corresponding to a portion of the laminated body 2 where the lug portions 9 are provided (the middle portion MP of the laminated body 2). The punched member Wb includes a portion corresponding to the yoke portion 4, portions corresponding to the plurality of tooth portions 5, and portions corresponding to the plurality of lug portions 9. In the punched member Wb shown in FIG. 2B, the portion corresponding to the yoke portion 4, the portion corresponding to the tooth portion 5, and the portion corresponding to the lug portion 9 are denoted by the same reference numerals as the yoke portion 4, the tooth portion 5, and the lug portion 9, respectively.

The shape (second shape) of the punched member Wb (second punched member) is different from the shape (first shape) of the punched member Wa (first punched member). In this case, in the laminated body 2, there is a portion not overlapping each other between the punched member Wa and the punched member Wb when viewed from the central axis Ax. As an example of the case where the shapes of the punched members W are different from each other, shapes of outer edges of the punched members W and/or shapes of openings (edges of the opening portions) formed at the center of the punched members W and surrounding the central axis Ax may be different from each other. In the example shown in FIG. 1, FIG. 2A, and FIG. 2B, the shape of the outer edge of the punched member Wb is different from the shape of the outer edge of the punched member Wa.

In the laminated body 2 including the punched member Wa and the punched member Wb, there is a portion where the shape is changed (hereinafter, referred to as a "design change portion") when observed from the bottom or from the top in the lamination direction. Specifically, the shape is changed (the design change portion is formed) at a boundary portion between two or more punched members Wa that are continuously laminated and two or more punched members Wb that are continuously laminated in the laminated body 2. In the design change portion, the punched member Wa and punched member Wb having different shapes are adjacent to each other in the lamination direction. In the example shown in FIG. 1, a boundary portion between the lower portion LP and the middle portion MP of the laminated body 2 and a boundary portion between the middle portion MP and the upper portion UP of the laminated body 2 correspond to the design change portion.

When the plurality of punched members W are laminated, so-called rotational lamination is performed to form the laminated body 2. The term "rotational lamination" refers to making angles of the plurality of punched members W relatively different from each other when the plurality of punched members W are laminated to obtain the laminated body 2. A main object of the rotational lamination is to reduce a plate thickness deviation among the plurality of punched members W constituting the laminated body 2. In the laminated body 2 formed by rotational lamination, two or more punched members W having the same angle of punched member W in the circumferential direction (hereinafter referred to as "rotational lamination angle") may be continuously laminated. The rotational lamination angle is defined by, for example, a position of a reference position of the punched member W in the circumferential direction.

In one example, the plurality of punched members W are laminated in units of blocks at different rotational lamination angles. The block includes a predetermined number of one or more punched members W or two or more punched members W. That is, the laminated body 2 includes a plurality of blocks arranged in the lamination direction and each including one or more punched members W. The rotational lamination angle is different between blocks adjacent to each other among the plurality of blocks arranged in the lamination direction. The predetermined number (number of punched members W) in each of the plurality of blocks is determined for each block. That is, the number of punched members W included in one block may be the same as or different from the number of punched members W included in another block.

The plurality of punched members W may be laminated in order such that the rotational lamination angles of the blocks adjacent to each other in the laminated body 2 are different by a constant angle. The constant angle may be 360°/M (M is a natural number of two or more). In one example, the constant angle is 180°, 120°, 90°, or 72°. Note that the "block" in the present disclosure does not necessarily mean that the laminated body 2 is obtained by laminating a plurality of blocks after a plurality of blocks are formed. A set of a plurality of punched members W having the same rotational lamination angle and continuously laminated is referred to as a "block". One block may include only one type of punched member W or may include two types of punched members W.

Figure 3A:
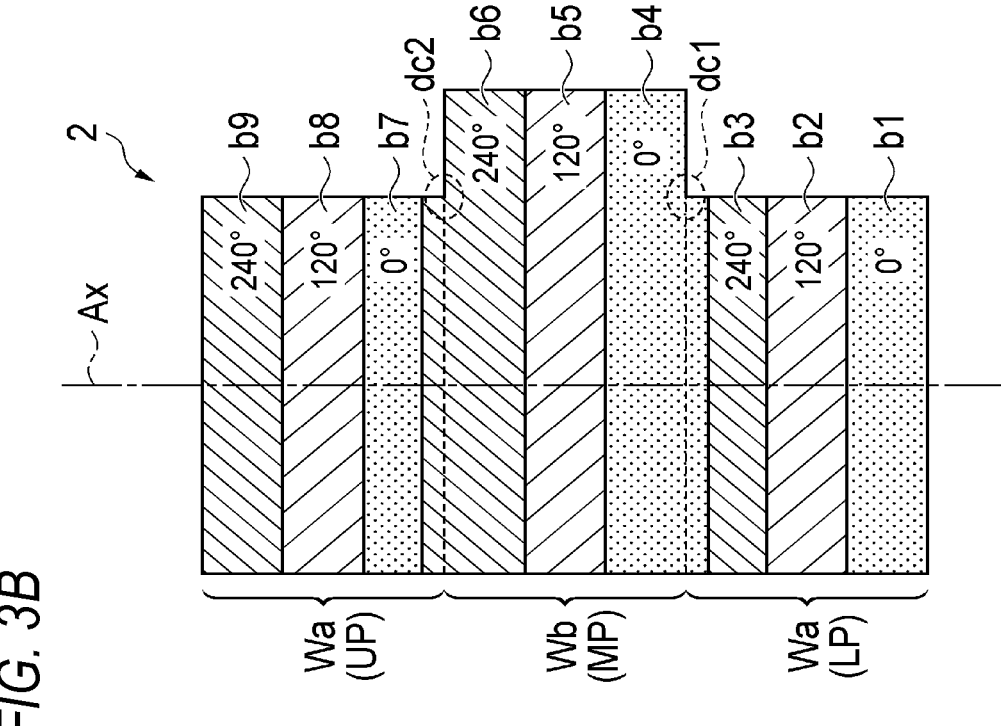
FIG. 3A is a schematic diagram showing a rotational lamination method according to a comparative example.
Figure 3B:
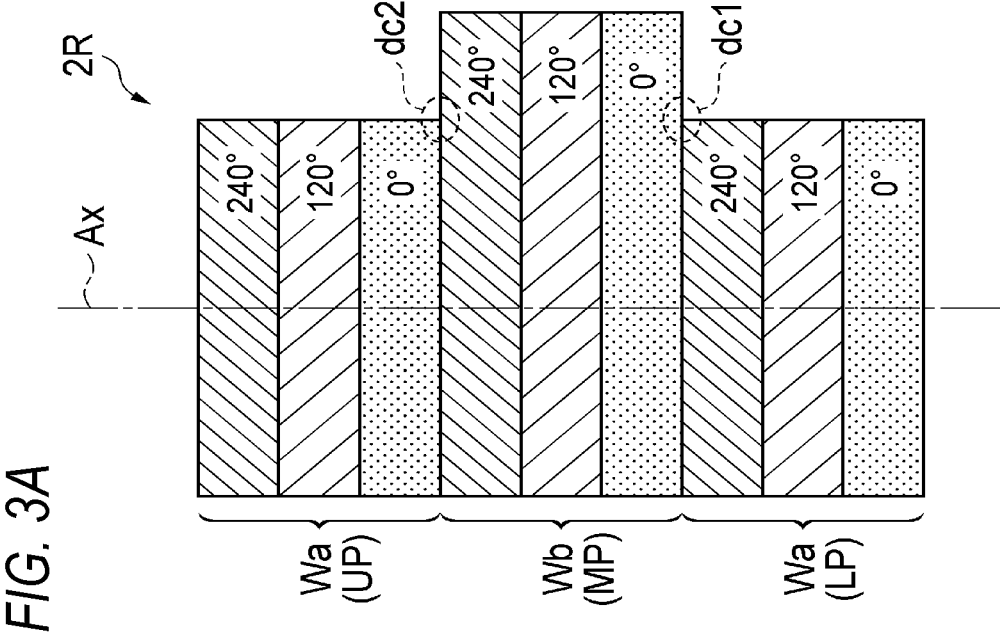
FIG. 3B is a schematic diagram showing a rotational lamination method according to the present disclosure.

Next, a rotational lamination method of the present disclosure will be described with reference to FIG. 3A and FIG. 3B. FIG. 3A and FIG. 3B schematically show side views of laminated bodies each including a plurality of punched members W. Further, a difference in the shape of the punched members W is shown depending on the size of a horizontal width on the paper, and the same pattern is applied to the blocks (a collection of a plurality of punched members W) having the same rotational lamination angle. The angle indicated by a numerical value represents a rotational lamination angle, and the rotational lamination angle is different by 120° for each block.

FIG. 3A shows a laminated body 2R according to a reference example in order to facilitate understanding of the rotational lamination method according to the present disclosure. Similarly to the laminated body 2, the laminated body 2R includes a plurality of punched members W including a plurality of punched members Wa and a plurality of punched members Wb. In the laminated body 2R, a plurality of punched members W are laminated without using the rotational lamination method according to the present disclosure. Similarly to the laminated body 2, in the laminated body 2R, the lower portion LP and the upper portion UP are constituted by a plurality of punched members Wa, and the middle portion MP is constituted by a plurality of punched members Wb. In each of the lower portion LP, the middle portion MP, and the upper portion UP of the laminated body 2R, a block having a rotational lamination angle of 0°, a block having a rotational lamination angle of 120°, and a block having a rotational lamination angle of 240° overlap in this order.

In the laminated body 2R configured as described above, there are two design change portions indicated by "dc1" and "dc2". In each of the design change portion dc1 and the design change portion dc2, the rotational lamination angles are different. That is, the rotational lamination angles are different between the punched member Wa and punched member Wb adjacent to each other in the lamination direction, which form the design change portions dc1 and dc2. It has been found that the following problems may occur when the rotational lamination angles are different in the design change portion. —Cracks occur in the design change portion. —A gap in the design change portion becomes larger. —Mechanical strength of the laminated iron core in the lamination direction, a direction along a main surface of the punched member, or the circumferential direction is insufficient. —An inclination of the magnetic pole with respect to the central axis Ax occurs in the design change portion.

In a rotational lamination portion including a pair of punched members that have different rotational lamination angles and are adjacent to each other in the lamination direction, a plate thickness deviation and the undulation of the metal sheet itself are different between an upper punched member and a lower punched member. Due to the difference in the plate thickness deviation or the like, misalignment is likely to occur between the punched members in the direction along the main surface of the punched member, the circumferential direction, or the lamination direction, and as a result, a gap is likely to occur between the punched members. On the other hand, in the design change portion, a portion where the metal sheet is present and a portion where the metal sheet is not present are adjacent to each other, and thus a state different from other portions in the lamination direction is obtained. Further, in the design change portion, punched members subjected to different punching processes are combined with each other, and manners of undulation of the punched members are different from each other. When two change points of the rotational lamination portion and the design change portion as described above exist in a same portion in the lamination direction, the problem as described above may occur.

In the rotational lamination method according to the present disclosure, in at least a part of the design change portions, the plurality of punched members W are laminated (rotationally laminated) such that the rotational lamination angles of a pair of punched members having different shapes from each other are the same. For example, in all the design change portions, the rotational lamination angle is the same between the punched member Wa and the punched member Wb adjacent to each other. In the laminated body 2 shown in FIG. 3B, similarly to the laminated body 2R, there are two design change portions (portions indicated by "dc1" and "dc2"), but unlike the laminated body 2R, the rotational lamination angles are the same in the respective design change portions. In the example, in the design change portion dc1 between the lower portion LP and the middle portion MP of the laminated body 2, the rotational lamination angle of the lower punched member Wa is 0°, and the rotational lamination angle of the upper punched member Wb is also 0°. In the design change portion dc2 between the middle portion MP and the upper portion UP of the laminated body 2, the rotational lamination angle of the lower punched member Wb is 240°, and the rotational lamination angle of the upper punched member Wa is also 240°.

In the example shown in FIGS. 3A and 3B, the laminated body 2 can be divided into blocks b1 to b9 arranged in order from the bottom in the lamination direction. In the block b1, only a plurality of punched members Wa having a rotational lamination angle of 0° are continuously laminated, and in the block b2, only a plurality of punched members Wa having a rotational lamination angle of 120° are continuously laminated. In the block b3, only a plurality of punched members Wa having a rotational lamination angle of 240° are continuously laminated. In the block b4, one or more punched members Wa having a rotational lamination angle of 0° are continuously laminated, and then a plurality of punched members Wb having a rotational lamination angle of 0° are continuously laminated. That is, in the laminated body 2R, the design change portion is located at a boundary between two blocks, but in the laminated body 2, the design change portion dc1 is located in the middle of one block (block b4).

In the block b5, only a plurality of punched members Wb having a rotational lamination angle of 120° are continuously laminated. In the block 6*b*, a plurality of punched members Wb having a rotational lamination angle of 240° are continuously laminated, and then one or more punched members Wa having a rotational lamination angle of 240° are laminated. That is, in the laminated body 2, the design change portion dc2 is located in the middle of one block (block b6). In the block b7, only a plurality of punched members Wa having a rotational lamination angle of 0° are continuously laminated, and in the block b8, only a plurality of punched members Wa having a rotational lamination angle of 120° are continuously laminated. In the block b9, only a plurality of punched members Wa having a rotational lamination angle of 240° are continuously laminated.

Here, when a set of two or more punched members W having the same rotational lamination angle (all punched members W having the same rotational lamination angle) in the laminated body 2 is referred to as a "member group", the laminated body 2 includes a plurality of member groups having different rotational lamination angles from each other. Each of the plurality of member groups (each member group) includes two or more punched members W having the same rotational lamination angle. Unlike the "block" described above, the member group refers to a set of a plurality of punched members W having the same rotational lamination angle, including the punched members W that are not continuously laminated.

In the laminated body 2, a total lamination thickness may be substantially the same among the plurality of member groups. That is, a total lamination thickness of one member group substantially matches a total lamination thickness of another member group. In the present disclosure, the fact that the total lamination thickness is substantially the same among the member groups means that the total lamination thickness of one member group is 0.95 times to 1.05 times the total lamination thickness of another member group. In the laminated body 2, the number of punched members W constituting one member group may be the same among the plurality of member groups. That is, the total lamination thickness may be substantially the same by matching the number of punched members W among the plurality of member groups.

The laminated body 2 shown in FIG. 3B includes three member groups. A first member group (b1, b4, b7) includes the block b1, the block b4, and the block b7. A second member group (b2, b5, b8) includes the block b2, the block b5, and the block b8. A third member group (b3, b6, b9) includes the block b3, the block b6, and the block b9. The number of punched members W constituting each of the first member group (b1, b4, b7), the second member group (b2, b5, b8), and the third member group (b3, b6, b9) may be the same.

For example, it is considered that the number of all the punched members Wa included in the lower portion LP of the laminated body 2R and 2, the number of all the punched members Wb included in the middle portion MP of the laminated body 2R and 2, and the number of all the punched members Wa included in the upper portion UP of the laminated body 2R and 2 are equal to each other. In this case, in the laminated body 2R, the number of punched members W can be made the same among the plurality of member groups by making the number of punched members W in all the blocks the same. On the other hand, in the laminated body 2, the number of punched members W in the block b3 is made smaller than an average value of the number of punched members W in one block and the number of punched members W in the block b4 is made larger than the average value, so that the rotational lamination angle is the same in the design change portion dc1. In the design change portion dc2, the number of punched members W in the block b6 is made larger than the average value and the number of punched members W in the block b7 is made smaller than the average value, so that a difference in the number of punched members W in the design change portion dc1 is cancelled.

In the laminated body 2, adjacent punched members W are connected (fixed) to each other by various connecting methods. The connecting methods is not particularly limited, and for example, adjacent punched members W may be connected to each other by a caulking portion, welding, application of an adhesive, using an adhesive steel plate, or forming a resin portion. Two or more of these connecting methods may be combined to connect the punched members W included in the laminated body 2.

Manufacturing Device for Laminated Iron Core

Next, an example of a device for manufacturing a laminated iron core will be described with reference to FIG. 4, FIG. 5A, FIG. 5B, and FIG. 6. A manufacturing device 50 is a device that executes at least a part of the processes of manufacturing the laminated iron core 1. The manufacturing device 50 is configured to form the laminated body 2 of the laminated iron core 1 from the strip-shaped metal sheet MS. The manufacturing device 50 includes, for example, an uncoiler 60, a feeding device 70, a press processing device 80, and a controller 100.

The uncoiler 60 is configured to rotatably hold a coil material 61. The coil material 61 is obtained by winding the metal sheet MS in a coil shape (spiral shape). The feeding device 70 includes rollers 71 and 72 that sandwich the metal sheet MS from above and below. The rollers 71 and 72, which are a pair of rollers, are configured to rotate and stop based on an operation instruction from the controller 100, and intermittently feed the metal sheet MS toward the press processing device 80.

The press processing device 80 is configured to operate based on an operation instruction from the controller 100 and punch the metal sheet MS along a predetermined shape to form a plurality of punched members W. The press processing device 80 can form each of the punched member Wa and the punched member Wb. The press processing device 80 is configured to, for example, form a plurality of punched members W by sequentially punching or cutting and bending the metal sheet MS fed by the feeding device 70 using a plurality of punches. The press processing device 80 may be configured to form the laminated body 2 by rotating and laminating the plurality of punched members W obtained by punching. That is, rotational lamination may be performed in the press processing device 80 that forms the punched members W by punching the metal sheet MS.

The press processing device 80 includes, for example, a base 81, a lower die 82, a die plate 83, a stripper 84, an upper die 85, a top plate 86, and a pressing machine 87. The base 81 supports the lower die 82 placed on the base 81. The lower die 82 supports the die plate 83 placed on the lower die 82. The lower die 82 is provided with a plurality of discharge holes through which a material punched out from the metal sheet MS (for example, the punched member W or a waste material) is discharged. The plurality of discharge holes are disposed at positions corresponding to a plurality of punches provided in the press processing device 80.

The die plate 83 has a function of forming the punched member W together with the plurality of punches. The lower die 82 is provided with a plurality of dies at positions corresponding to the plurality of punches. The stripper 84 has a function of separating the metal sheet MS in close contact with the plurality of punches from the plurality of punches when the metal sheet MS is punched by the plurality of punches. The stripper 84 has a function of pressing the metal sheet MS against the die plate 83 when the metal sheet MS is punched by the plurality of punches. The upper die 85 is disposed above the stripper 84, and the plurality of punches are attached to the upper die 85.

The top plate 86 is disposed above the upper die 85 and supports the upper die 85. The pressing machine 87 is connected to the top plate 86, and drives the stripper 84, the upper die 85, the top plate 86, and the plurality of punches in the vertical direction based on an operation instruction from the controller 100. The plurality of punches provided in the press processing device 80 are formed so as to punch the metal sheet MS into a predetermined shape. The plurality of punches are arranged side by side along a direction in which the metal sheet MS is fed (hereinafter, referred to as a "feeding direction D1").

Figure 5A:
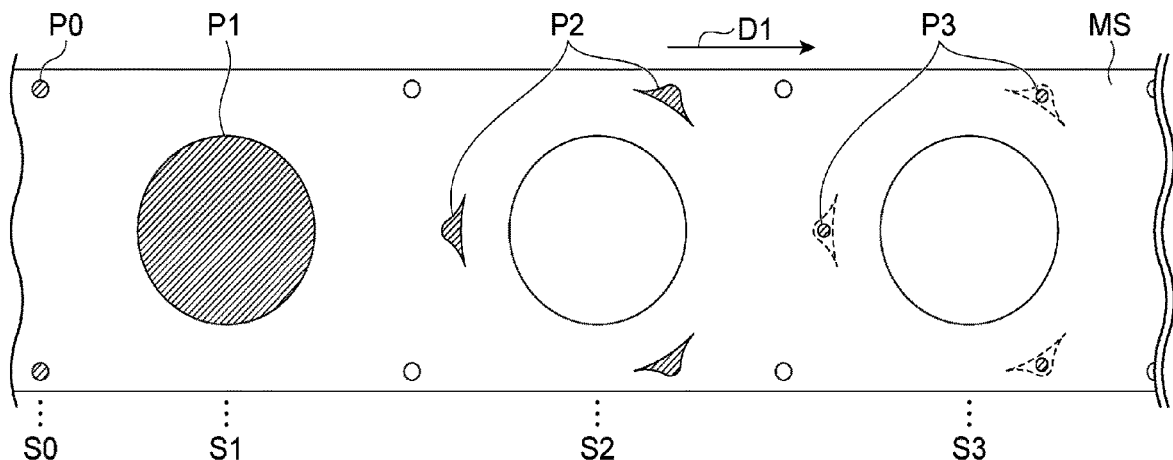
FIGS. 5A and 5B are diagrams showing an example of a layout of punching.
Figure 5B:
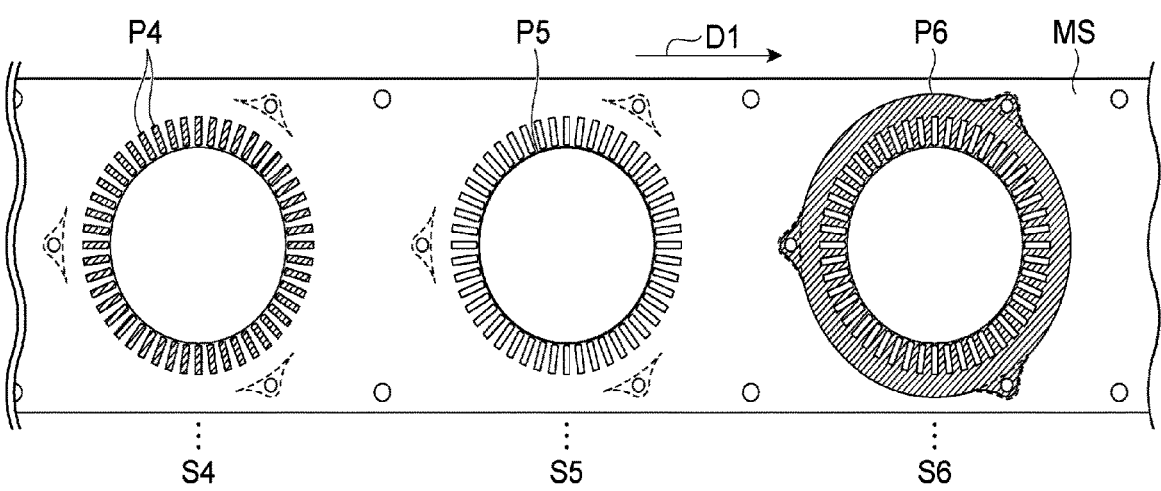

FIG. 5A and FIG. 5B illustrate how punching is performed by the press processing device 80. Due to the size of the paper, the metal sheet MS is shown in two rows in FIG.

5A and FIG. 5B, but the right end of the metal sheet MS shown in FIG. 5A is connected to the left end of the metal sheet MS shown in FIG. 5B. In FIG. 5A and FIG. 5B, "S0", "S1", "S2", . . . , and "S6" represent positions where processing is performed by the plurality of punches in the press processing device 80, respectively. The positions S0 to S6 are arranged in this order from upstream in the feeding direction D1.

At the position S0, the corresponding punch punches the metal sheet MS along a punching shape P0 to form a pair of through holes in the vicinity of both side edges of the metal sheet MS in a width direction. A pilot pin for positioning is inserted into the pair of through holes downstream of the position S0. At the position S1, the corresponding punch forms a through hole by punching the metal sheet MS along a punching shape P1. The punching shape P1 is circular and smaller in diameter than the through hole 2a of the laminated body 2.

At the position S2, the corresponding punch forms a plurality of punched portions by punching the metal sheet MS along a punching shape P2. The punching shape P2 has a shape corresponding to the lug portions 9 (outer edges of the lug portions 9). In a case of forming the punched member Wa having no lug portion 9 at a portion of the metal sheet MS disposed at the position S2 according to an operation instruction from the controller 100, the press processing device 80 punches the metal sheet MS along the punching shape P2 using the corresponding punch. In a case of forming the punched member Wb having the lug portions 9 at a portion of the metal sheet MS disposed at the position S2 according to an operation instruction from the controller 100, the press processing device 80 does not punch the metal sheet MS with the corresponding punch (does not form the plurality of punched portions).

At the position S3, the corresponding punch forms a plurality of through holes by punching the metal sheet MS along a punching shape P3. The plurality of through holes formed along the punching shape P3 correspond to the through holes 9a of the lug portions 9, respectively. At the position S3, the punching operation of the corresponding punch is performed regardless of the presence or absence of the processing at the position S2. In a case where the plurality of punched portions along the punching shape P2 are formed at the position S2 (in a case where the punched member Wa is formed), the plurality of through holes along the punching shape P3 are not formed. In a case where the plurality of punched portions along the punching shape P2 are not formed at the position S2 (in a case where the punched member Wb is formed), the plurality of through holes along the punching shape P3 are formed.

At the position S4, the corresponding punch forms a plurality of punched portions by punching the metal sheet MS along a punching shape P4. The plurality of punched portions along the punching shape P4 correspond to the slots 7 formed between adjacent tooth portions 5, respectively. By forming the plurality of punched portions along the punching shape P4, the plurality of tooth portions 5 whose tip end portions are connected to each other are formed. At the position S5, the corresponding punch punches the metal sheet MS along the punching shape P5 to punch the tip end portions of the plurality of tooth portions 5. Accordingly, the plurality of tooth portions 5 are separated.

At the position S6, the punched member W is formed by punching the metal sheet MS along a punching shape P6 corresponding to the outer edge of the punched member Wb with the corresponding punch. When the plurality of punched portions are formed along the punching shape P2 at the position S2, the portion corresponding to the lug portions 9 are already punched out, so that the punched member Wa is formed. When the plurality of punched portions are not formed along the punching shape P2 at the position S2, the portion corresponding to the lug portions 9 remain, so that the punched member Wb is formed. The press processing device 80 may alternately and repeatedly form a plurality of punched members Wa continuously and form a plurality of punched members Wb continuously according to an operation instruction from the controller 100. When the punched members W adjacent to each other are connected to each other by the application of the adhesive, the adhesive may be applied to a position corresponding to the main surface of the punched member W in any process before the punching at the position S6.

Figure 6:
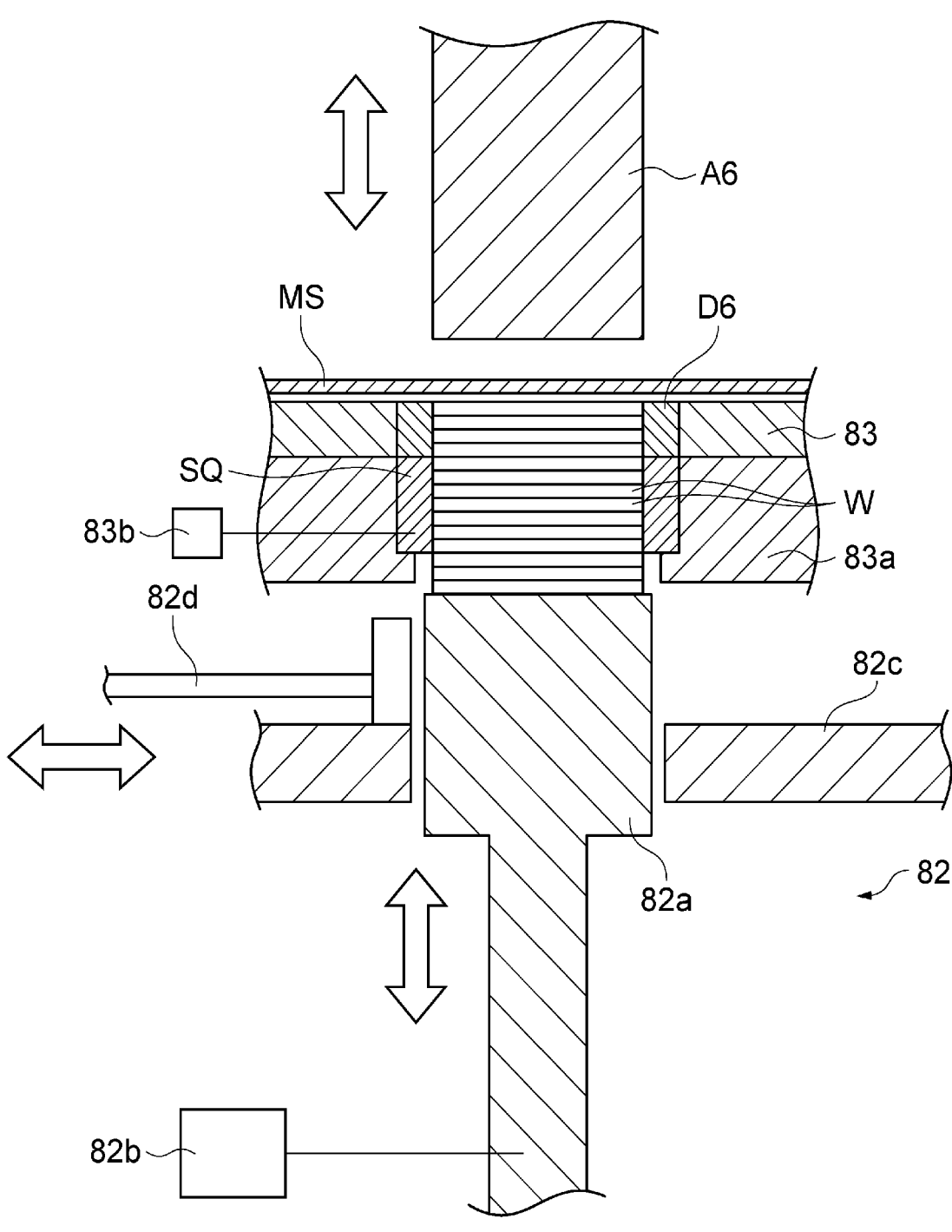
FIG. 6 is a cross-sectional view schematically showing a portion where the punched member is laminated in the manufacturing device.

FIG. 6 schematically shows a discharge hole through which the punched member W is discharged at the position S6 and members around the discharge hole. In FIG. 6, the punch corresponding to the position S6 is indicated by "A6", and the corresponding die is indicated by "D6". The die D6 is provided on the die plate 83. The die plate 83 is installed on a die holder 83a. A squeeze ring SQ provided in the die holder 83a is disposed below the die D6, and the die D6 may be installed on the squeeze ring SQ.

The punched member W punched by the punch A6 and the die D6 passes through the die D6 and reaches the squeeze ring SQ. The squeeze ring SQ is formed in a tubular shape, and is configured to apply a lateral pressure toward the inside from an outer peripheral side of the punched member W to the punched member W. Therefore, when the punched member W reaches the squeeze ring SQ, the punched member W is held by the squeeze ring SQ. A drive unit 83b including a motor, a belt, and the like is connected to the squeeze ring SQ. The drive unit 83b rotates the squeeze ring SQ in the circumferential direction based on an operation instruction from the controller 100. As the squeeze ring SQ rotates, the punched member W rotates in the circumferential direction. Each time one or more punched members W are punched out, the drive unit 83b rotates the squeeze ring SQ to perform the rotational lamination.

The lower die 82 includes, for example, a support member 82a, a drive unit 82b, a stage 82c, and a pusher 82d. The support member 82a supports the punched member W in order to prevent the punched member W (the punched member Wa and the punched member Wb) that is punched out from the metal sheet MS by the punch A6 and exposed from below the squeeze ring SQ from falling downward. The drive unit 82b drives the support member 82a in the vertical direction. The drive unit 82b intermittently moves the support member 82a downward each time the punched member W is laminated on the support member 82a based on an operation instruction from the controller 100.

When a predetermined number of punched members W are laminated on the support member 82a to form the laminated body 2, the support member 82a moves to a position where an upper surface of the support member 82a is at the same height as an upper surface of the stage 82c. The pusher 82d operates based on an operation instruction from the controller 100 and is movable in a horizontal direction. In a state in which the support member 82a is moved to the position where the upper surface of the support member 82a is at the same height as the upper surface of the stage 82c, the pusher 82d pushes out the laminated body 2 from the support member 82a to the stage 82c. The laminated body 2 pushed out to the stage 82c is discharged to the outside of the manufacturing device 50.

In the above-described example of the punching processing, only the punched member W corresponding to the core for a stator is punched out, but before punching out the punched member W, a punched member corresponding to the core for a rotor may be punched out (so-called co-cutting may be performed). In this case, processing and punching are performed in a region inside an outer edge of the punching shape P1 upstream of the position S1 at which the punching shape P1 is punched, and a punched member corresponding to the core for a rotor is formed. In the case where the co-cutting is performed, a pilot hole into which the pilot pin is inserted may be formed at the most upstream position in the punching process for the rotor, and the pilot hole may be used in the punching process for the stator. A pilot hole different from the pilot hole formed in the punching process for the rotor may be newly formed (the pilot hole may be punched out again) at an upstream position in the punching process for the stator.

The controller 100 is a computer that controls each device included in the manufacturing device 50. The controller 100 is configured to generate a signal for causing the feeding device 70 and the press processing device 80 to operate based on, for example, a program recorded in a recording medium or an operation input by an operator. The controller 100 is configured to transmit the signal to the feeding device 70 and to the press processing device 80.

Manufacturing Method for Laminated Iron Core

Next, a manufacturing process of the laminated iron core 1 performed in the manufacturing device 50 will be described as an example of a manufacturing method for a laminated iron core. The manufacturing process of the laminated iron core 1 includes at least a punching process and a laminating process. The punching process is a process of punching the metal sheet MS to form a plurality of punched members W including the punched member Wa and the punched member Wb. The punching process is performed in the press processing device 80. The laminating process is a process of forming the laminated body 2 by laminating the plurality of punched members W while changing a rotational lamination angle representing an angle of the punched member W in the circumferential direction every time one or more punched members W are laminated. In the laminating process, laminating the plurality of punched members W while changing the rotational lamination angle may be performed in the press processing device 80 (inside the press processing device 80).

In the laminating process, the plurality of punched members W are laminated such that the rotational lamination angles between the punched member Wa and punched member Wb adjacent to each other are the same in the boundary portion between two or more punched members Wa that are continuously laminated and two or more punched members Wb that are continuously laminated. For example, in each of the design change portions dc1 and dc2 in the laminated body 2, the rotational lamination angle of the punched member Wa and the rotational lamination angle of the punched member Wb are set to the same angle, and the plurality of punched members W are laminated. Note that the expression that the rotational lamination angles between the punched members W are the same means that the set values of the rotational lamination angles are the same, and the rotational lamination angles are substantially the same at the time of laminating. In the laminating process, the plurality of punched members W may be laminated such that the total lamination thickness is substantially the same among the plurality of member groups. In one example, the plurality of punched members W are laminated such that the number of all the punched members W (a total number of punched members W) included in each member group is the same among the plurality of member groups.

Figure 7A:
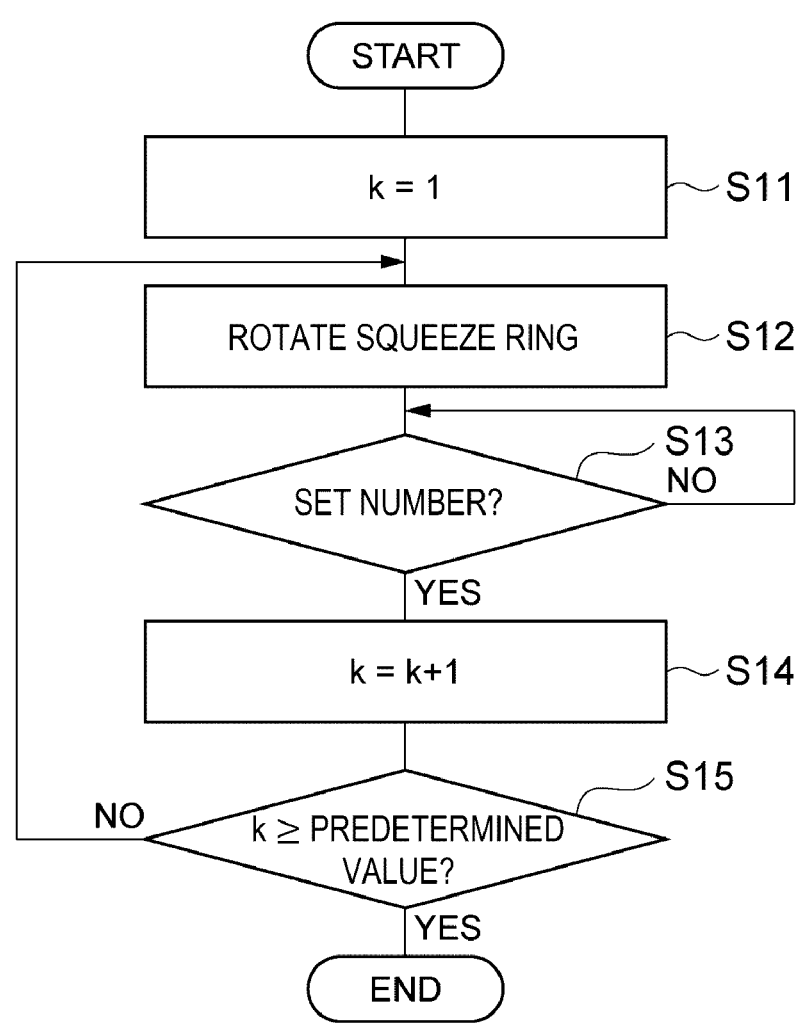
FIG. 7A is a flowchart showing an example of a method for forming a laminated body.

An example of the laminating process will be described with reference to FIG. 7A and FIG. 7B in a case where the laminating process including the rotational lamination is performed in the press processing device 80. The laminating process may be performed in parallel with the punching process. FIG. 7A is a flowchart showing an example of the laminating process performed when forming one laminated body 2. Hereinafter, a case where the laminated body 2 (the laminated body 2 including the blocks b1 to b9) shown in FIG. 3B is formed will be described as an example. The number of all the punched members Wa included in the lower portion LP of the laminated body 2 is 300, the number of all the punched members Wb included in the middle portion MP of the laminated body 2 is 300, and the number of all the punched members Wa included in the upper portion UP of the laminated body 2 is set to 300. In this case, the controller 100 controls the press processing device 80 such that the formation of 300 punched members Wa, the formation of 300 punched members Wb, and the formation of 300 punched members Wa are performed in this order.

The table shown in FIG. 7B is an example of information held by the controller 100 for executing the laminating process. In the information shown in FIG. 7B, the rotational lamination angle and the number of punched members W are determined for each block included in the blocks b1 to b9 arranged in order from the bottom. The controller 100 first executes step S11. In step S11, the controller 100 sets k to 1.

Next, the controller 100 executes step S12. In step S12, for example, the controller 100 refers to information related to the lamination shown in FIG. 7B, and causes the drive unit 83*b* to rotate the squeeze ring SQ according to the rotational lamination angle determined with respect to a current set value of k. In one example, when the rotational lamination angle is 0°, the controller 100 causes the drive unit 83*b* to rotate the squeeze ring SQ so that the squeeze ring SQ is positioned at a reference position (initial position).

Next, the controller 100 executes step S13. In step S13, for example, the controller 100 waits until the set number of punched members determined with respect to the current set value of k is laminated. While waiting in step S13, the controller 100 causes the drive unit 82*b* to intermittently move the support member 82*a* downward. By executing step S13, a set number of punched members W are laminated in a state where the same rotational lamination angle is set.

Next, the controller 100 executes steps S14 and S15. In step S14, for example, the controller 100 adds 1 to the current value of k. In step S15, for example, the controller 100 determines whether the set value of k is a predetermined value or more. When the information shown in FIG. 7B is used, the predetermined value is set to 10.

In Step S15, when it is determined that k is smaller than the predetermined value (Step S15: NO), the processing executed by the controller 100 returns to Step S12, and the controller 100 repeats the series of processing of Steps S12 to S15. Every time step S12 is executed after 1 is added to k, the squeeze ring SQ is rotated by 120° in the same rotation direction. Accordingly, the rotational lamination angle changes by 120° between two consecutive blocks.

In step S15, when it is determined that k is equal to or greater than the predetermined value (step S15: YES), the process of laminating the one laminated body 2 is ended. Then, the controller 100 controls the press processing device

80 so as to push out the laminated body 2 to the stage 82*c* with the pusher 82*d*, and then discharge the laminated body 2 to the outside of the press processing device 80. Thereafter, in the manufacturing device 50, a subsequent process (for example, formation of a resin portion or the like) is performed on the laminated body 2 to manufacture the laminated iron core 1.

When the series of processing described above is executed, the controller 100 changes the set value of k from 3 to 4 while the plurality of punched members Wa constituting the lower portion LP of the laminated body 2 are continuously laminated. That is, while the plurality of punched members Wa constituting the lower portion LP of the laminated body 2 are continuously laminated, the set value of the rotational lamination angle is changed, and a rotation position of the squeeze ring SQ is changed. Further, the controller 100 changes the set value of k from 6 to 7 while the plurality of punched members Wa constituting the upper portion UP of the laminated body 2 are continuously laminated. That is, while the plurality of punched members Wa constituting the upper portion UP of the laminated body 2 are continuously laminated, the set value of the rotational lamination angle is changed, and the rotation position of the squeeze ring SQ is changed. As described above, the laminated body 2 is formed such that the rotational lamination angle does not change in each of the design change portions dc1 and dc2.

Modifications

The disclosure in this description should be considered to be illustrative and not restrictive in all respects. Various omissions, substitutions, or modifications may be made to the above examples without departing from the scope of the claims and the gist thereof.

In the example shown in FIG. 3B, the rotational lamination portions in which the rotational lamination angle is changed are located below the design change portion dc1 and above the design change portion dc2, respectively. Alternatively, the rotational lamination portions may be located above the design change portion dc1 and below the design change portion dc2. In this case, a total number of punched members W in the block b3 is larger than the average value of the number of punched members W in one block, while a total number of punched members W in the block b6 is smaller than the average value. Further, a total number of the punched members W in the block b4 is smaller than the average value, while a total number of the punched members W in the block b7 is larger than the average value.

In the above-described example, the laminated body 2 is divided into three regions (the lower portion LP, the middle portion MIP, and the upper portion UP) since the punched member Wa and the punched member Wb coexist. Alternatively, the number of divided regions is not limited to three, and may be two or four or more. For example, the laminated body 2 may be divided into two regions, that is, a region in which a plurality of punched members Wa are continuously laminated and a region in which a plurality of punched members Wb are continuously laminated.

A design change portion may be formed by a difference in the shape of the outer edge other than the presence or absence of the lug portion 9. For example, the design change portion may be formed by changing the outer diameter of the yoke portion 4 in at least a part of the circumferential direction around the central axis Ax.

Figure 4:
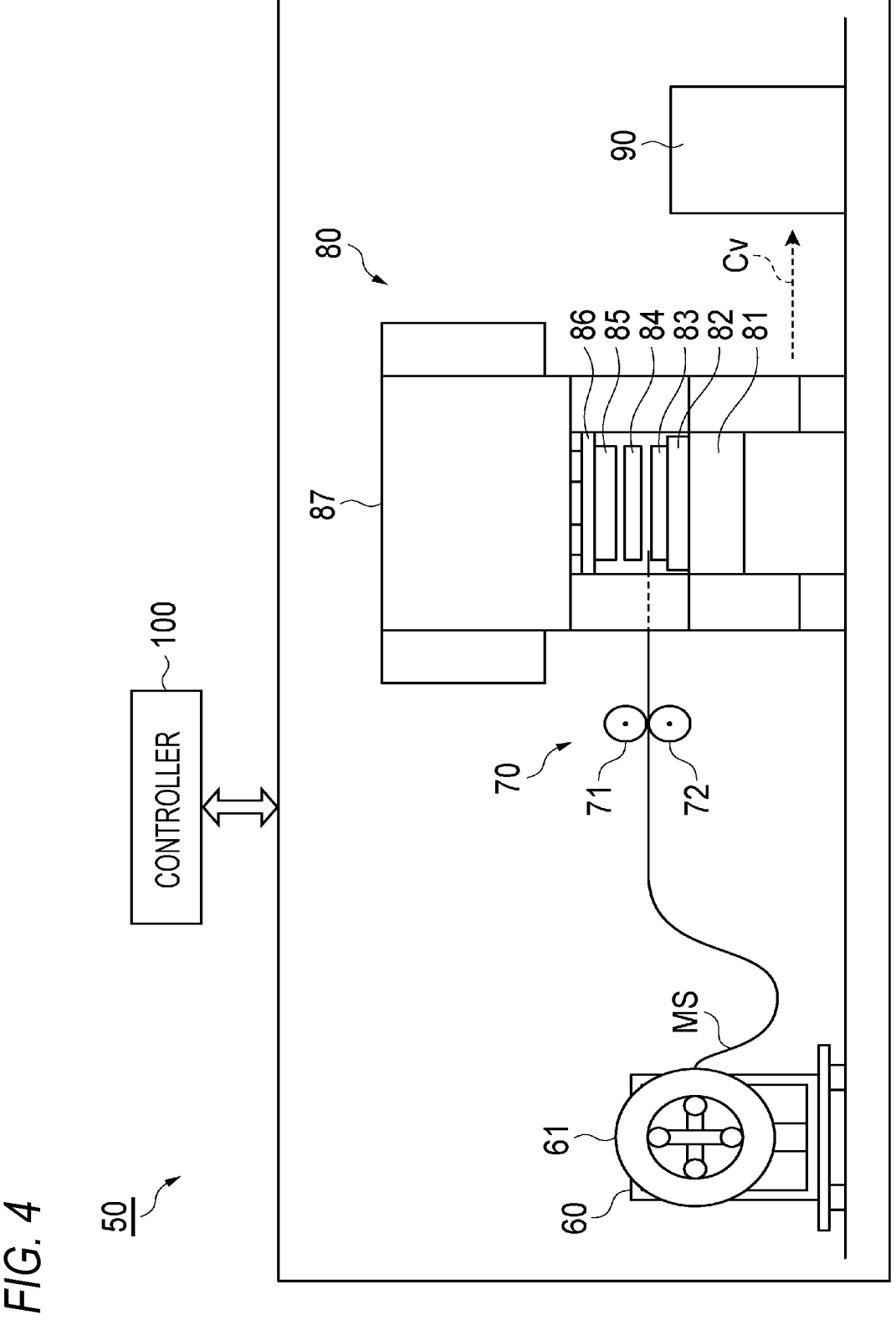
FIG. 4 is a schematic diagram showing an example of a manufacturing device for a laminated iron core.

In the above-described example, the rotational lamination in the laminating process is performed inside the press processing device 80. Alternatively, the rotational lamination in the laminating process may be performed outside the press processing device 80. For example, as shown in FIG. 4, the manufacturing device 50 may include a laminating device 90. The laminating device 90 is a device that operates based on an operation instruction from the controller 100 and is capable of executing the rotational lamination in the laminating process.

In one example, the press processing device 80 punch the plurality of punched members W constituting the laminated body 2 in order, and then laminates a plurality of punched members W to form a temporary laminated body without performing rotational lamination. In the temporary laminated body, the punched members W may be temporarily fixed to each other by temporary caulking or the like. The temporary laminated body discharged by the press processing device 80 is conveyed to the laminating device 90 by a conveyor Cv. The laminating device 90 repeats a series of processes including taking out one punched member W from the temporary laminated body, applying an adhesive to the punched member W taken out, and rotating and laminating the punched member W according to a rotational lamination angle set in a laminating order. The laminating device 90 repeats the series of processes described above based on an operation instruction of the controller 100 so that the rotational lamination angle does not change in the design change portion.

In another example, the press processing device 80 forms a plurality of block bodies forming the laminated body 2 in order, and individually discharges the plurality of block bodies to the outside of the press processing device 80. Each of the plurality of block bodies is a laminated body formed by laminating a plurality of punched members W without being rotated. In one block body, the plurality of punched members W are connected to each other by a caulking portion, a resin portion, or the like. The plurality of block bodies discharged from the press processing device 80 are conveyed to the laminating device 90 by the conveyor Cv. The laminating device 90 laminates the block bodies while changing the rotational lamination angle for each block body, and joins the block bodies by welding, for example.

The press processing device 80 forms a plurality of block bodies based on an operation instruction of the controller 100 such that an end surface of each block body is not constituted by either a punched member Wa or a punched member Wb serving as the design change portion. That is, a certain block body among the plurality of block bodies is formed to include both the punched member Wa and the punched member Wb, and the design change portion is already formed in a state where the block body is formed.

Figure 8A:
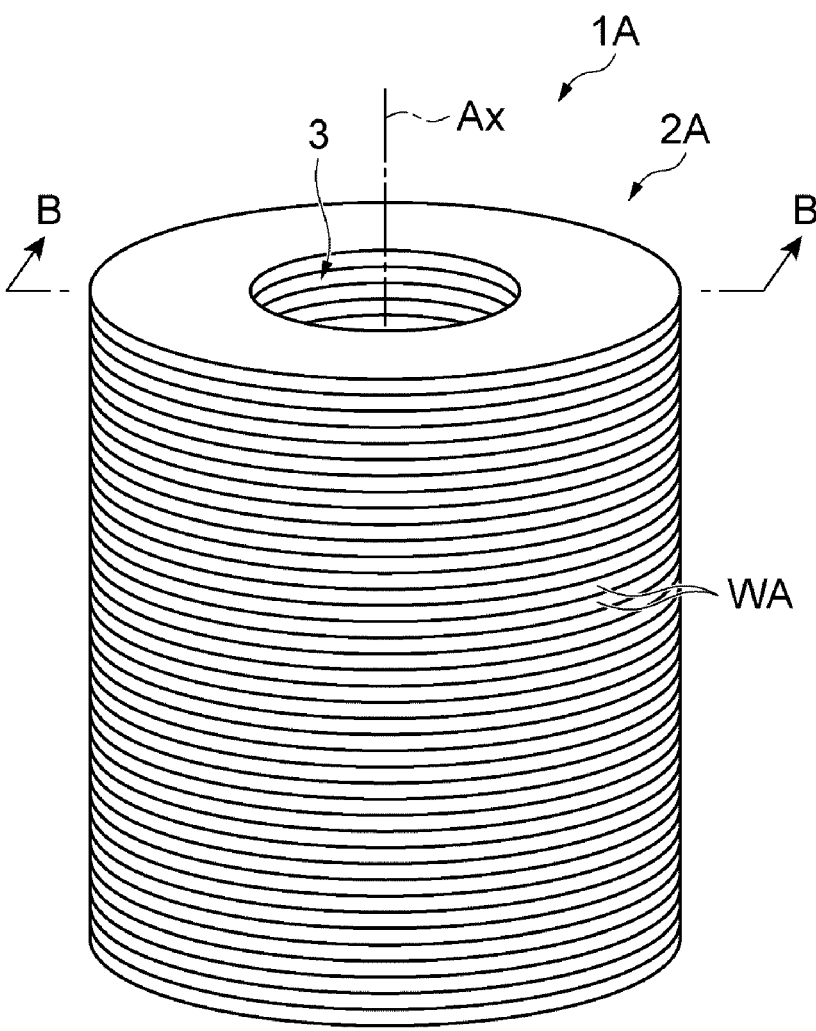
FIG. 8A is a perspective view showing an example of a laminated iron core.
Figure 8B:
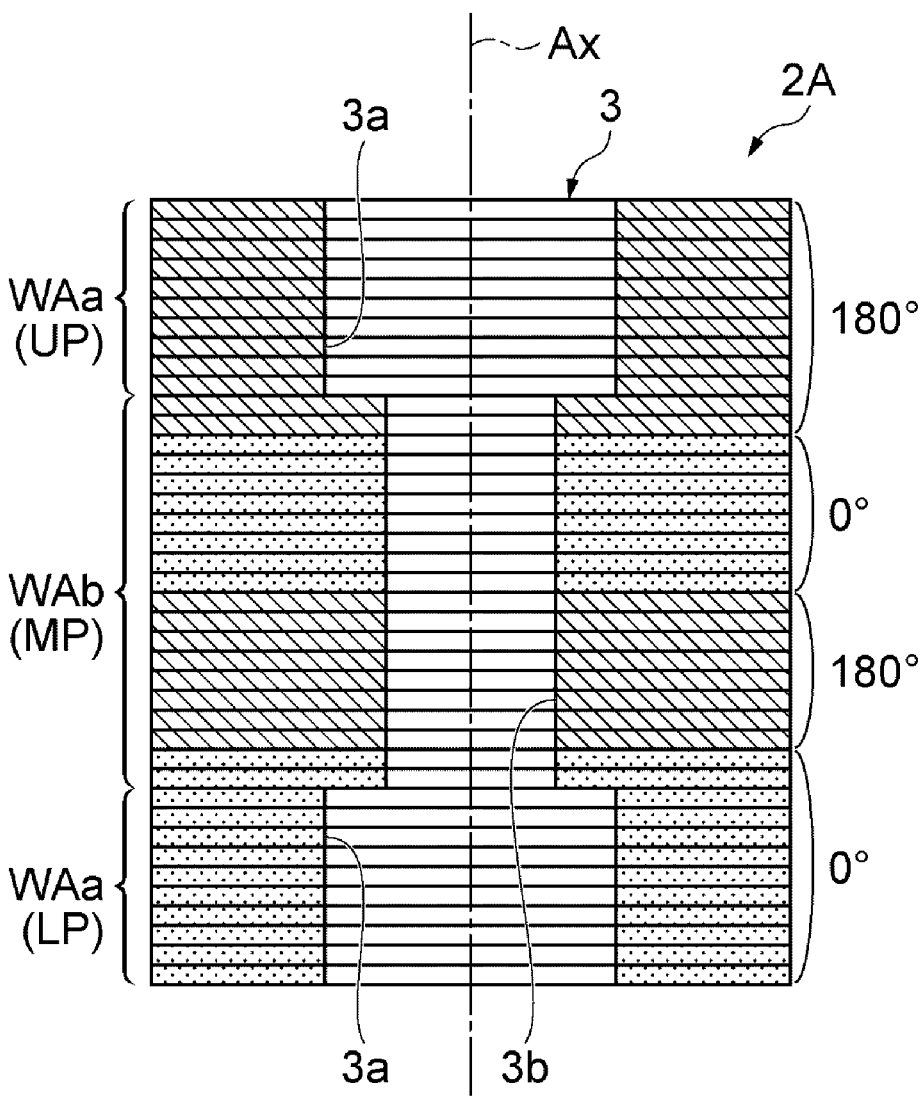
FIG. 8B is a cross-sectional view schematically showing an example of a laminated body.

FIG. 8A and FIG. 8B show a laminated iron core 1A as an example of the laminated iron core. The laminated iron core 1A is a core for a rotor (rotor laminated iron core). For example, the rotor is formed by attaching a shaft to the laminated iron core 1A. The laminated iron core 1A may be used in an embedded magnet (IPM) motor. The laminated iron core 1A includes a laminated body 2A. A plurality of magnets may be attached to the laminated body 2A according to the application or required performance of the motor.

The laminated body 2A is formed by laminating a plurality of punched members WA. The laminated body 2A (laminated iron core 1A) is formed in a cylindrical shape. An axial hole 3 penetrating the laminated body 2A is provided in a central portion of the laminated body 2A so as to extend along the central axis Ax of the laminated iron core 1A. The axial hole 3 extends in the lamination direction. FIG. 8B shows a cross section taken along a line B-B shown in FIG. 8A, and in the laminated body 2A, an inner diameter of the axial hole 3 varies depending on a position in the lamination direction. In the example shown in FIG. 8B, a through portion 3b is formed in a middle portion MP of the laminated body 2A, and a through portion 3a having an inner diameter larger than that of the through portion 3b is formed in each of an upper portion UP and a lower portion LP that sandwich the middle portion MP. The axial hole 3 includes two through portions 3a and one through portion 3b.

Similarly to the punched member W, the punched member WA is a plate-shaped body formed by punching the metal sheet MS along a predetermined shape. As described above, in the laminated body 2A, the inner diameter of the axial hole 3 varies depending on the position in the lamination direction. Therefore, the plurality of punched members WA include two types of punched members WA having different shapes. Hereinafter, the punched member WA constituting the through portion 3a is referred to as a "punched member WAa", and the punched member WA constituting the through portion 3b is referred to as a "punched member WAb". In the example shown in FIG. 8B, each of the upper portion UP and the lower portion LP of the laminated body 2A does not include the punched member WAb and is formed of only a plurality of punched members WAa. Further, the middle portion MP of the laminated body 2A does not include the punched member WAa and is formed only of a plurality of punched members WAb.

The shape (second shape) of the punched member WAb (second punched member) is different from the shape (first shape) of the punched member WAa (first punched member). In the example shown in FIG. 8B, the shape of the hole corresponding to the axial hole 3 of the punched member WA is different. That is, a shape of an opening (edge of an opening portion) formed in the punched member WA and surrounding the central axis Ax is different. Unlike the example shown in FIG. 8B, the shape of the outer edge of the punched member WA may be different between the punched member WAa and the punched member WAb, and both the shape of the outer edge of the punched member WA and the shape of the opening surrounding the central axis Ax may be different.

In the laminated body 2A, there are also two design change portions as in the laminated body 2 shown in FIG. 1 and the like. The plurality of punched members WA may be rotated and laminated so that the rotational lamination angle is the same between the punched member WAa and the punched member WAb in each of the two design change portions. The laminated iron core 1A including the laminated body 2A may be manufactured by the above-described manufacturing device 50. The laminated iron core 1A including the laminated body 2A may be manufactured by the manufacturing method including the punching process and the laminating process described above.

In one example, the lower portion LP of the laminated body 2A is formed by laminating a plurality of punched members WAa in a state where the rotational lamination angle is set to 0°. Next, in a state where the rotational lamination angle is still set to 0°, one or more punched members WAb are laminated on the lower portion LP. Then, after a plurality of punched members WAb are laminated in a state where the rotational lamination angle is set to 180°, a plurality of punched members WAb are laminated in a state where the rotational lamination angle is set to 0°. At this stage, the middle portion MP of the laminated body 2A is not completed. Next, the middle portion MP of the laminated body 2A is formed by laminating one or more punched members WAb in a state where the rotational lamination angle is set to 180°. Thereafter, in a state where the rotational lamination angle is still set to 180°, a plurality of punched members WAa are laminated to form the upper portion UP of the laminated body 2A.

In the example described above, the laminated body 2 is formed by two types of punched members W. Alternatively, the laminated body 2 may be formed by the punched member Wa and the punched member Wb, and one or more types of other punched member W having a shape different from those of both the punched member Wa and the punched member Wb. In this case, at least one of the punched member Wa and the punched member Wb and the one type of punched member W form another design change portion. In the other design change portion, the rotational lamination angle may be the same between a pair of punched members W.

When determining whether it is a design change portion, the shape of the punched member W may be defined only by two shapes, the shape of the outer edge of the punched member W and the shape of the opening (the edge of the opening portion) formed at the center of the punched member W and surrounding the central axis Ax. In this case, if at least a part of the two shapes is different, a design change portion is formed, and if the two shapes are the same, a design change portion is not formed even if a shape of another interior portion (for example, the through hole) is different. In at least some of the design change portions, the rotational lamination (formation of the laminated body 2 and 2A) may be performed in any manner as long as the rotational lamination is performed such that the rotational lamination angle is the same between the pair of punched members W. In one of the various examples described above, at least some of the items described in the other examples may be combined.

SUMMARY OF PRESENT DISCLOSURE

[1] A manufacturing method for a laminated iron core 1, 1A, the manufacturing method including: a punching process of punching a metal sheet MS to form a plurality of punched members W including a punched member Wa, WAa having a first shape and a punched member Wb, WAb having a second shape different from the first shape; and a laminating process of forming a laminated body 2, 2A by laminating the plurality of punched members W while changing a rotational lamination angle each time one or more punched members W are laminated, the rotational lamination angle representing an angle of the punched member W in a circumferential direction, in which in the laminating process, the plurality of punched members W are laminated such that the rotational lamination angle is the same between the punched member Wa, WAa and the punched member Wb, WAb adjacent to each other in a boundary portion between two or more of the punched members Wa, WAa that are continuously laminated and two or more of the punched members Wb, WAb that are continuously laminated.

As described above, when the rotational lamination angle is different in the design change portion including A pair of punched members W of different shapes adjacent to each other, various problems such as generation of cracks and enlargement of a gap may occur due to two factors, the design change portion and the change in the rotational lamination angle. In this regard, in the manufacturing method for the laminated iron core 1, 1A, the rotational lamination angle is the same between the punched member Wa, WAa and the punched member Wb, WAb adjacent to each other in the boundary portion, and the rotational lamination angle is not changed in the design change portion including the pair of punched members W. Therefore, the various problems described above hardly occur in the formed laminated body 2, 2A. This is useful for reducing the influence of a plate thickness deviation and a shape change.

[2] In the manufacturing method according to [1], the laminated body 2, 2A formed in the laminating process includes a plurality of member groups having different rotational lamination angles, the plurality of member groups each include two or more punched members W having the same rotational lamination angle, and in the laminating process, the plurality of punched members W are laminated such that a total lamination thickness is substantially the same among the plurality of member groups.

In this case, the total lamination thickness is substantially the same for each rotational lamination angle. Therefore, it is possible to further reduce the influence of the plate thickness deviation while avoiding a change in the rotational lamination angle in the design change portion.

[3] In the manufacturing method according to [1] or [2], the laminated iron core 1, 1A is a core for a stator, and a shape of an outer edge of the punched member W is different between the first shape and the second shape.

Depending on the specification of the motor in which the core for a stator is used, the shape of the outer edge may be different depending on the position of the core in the lamination direction. In the above-described manufacturing method, even if the shape of the outer edge of the punched member W is different depending on the position in the lamination direction, the influence can be reduced.

[4] In the manufacturing method according to [1] or [2], the laminated iron core 1, 1A is a core for a rotor, and the first shape and the second shape differ in at least one of a shape of an opening (axial hole 3) formed in the punched member W and surrounding a central axis Ax of the laminated iron core 1, 1A, and a shape of an outer edge of the punched member W.

Depending on the specification of the motor in which the core for a rotor is used, at least one of the shape of the opening and the shape of the outer edge may be different depending on the position of the core in the lamination direction. In the above-described manufacturing method, even if the shape of the opening or the outer edge of the punched member W is different depending on the position in the lamination direction, the influence can be reduced.

[5] In the manufacturing method according to any one of [1] to [4], in the laminating process, the laminating the plurality of punched members W while changing the rotational lamination angle is performed in the press processing device 80 that punches the metal sheet MS to form the plurality of punched members W.

In this case, it is not necessary to provide a device for performing the rotational lamination outside the press processing device 80. Therefore, a device for manufacturing the laminated iron core 1, 1A can be simplified.

[6] In the manufacturing method according to any one of [1] to [4], in the laminating process, the laminating the plurality of punched members W while changing the rotational lamination angle is performed outside a device that punches the metal sheet MS to form the plurality of punched members W.

In this case, punching and forming the plurality of punched members W for forming one laminated body 2 in the press processing device 80 and rotational lamination for obtaining another laminated body 2 can be performed in parallel. Therefore, the manufacturing efficiency can be improved.

[7] A laminated iron core 1, 1A, including: a laminated body 2, 2A formed by laminating a plurality of punched members W, WA including a punched member Wa, WAa having a first shape and a punched member Wb, WAb having a second shape different from the first shape, in which the laminated body 2, 2A includes a plurality of blocks (blocks b1 to b9) arranged in a lamination direction and each including one or more punched members W, and in the laminated body 2, 2A, a rotational lamination angle, which represents an angle of the punched member in a circumferential direction, is different between blocks adjacent to each other among the plurality of blocks (blocks b1 to b9), and the rotational lamination angle is the same between the punched member Wa, WAa and the punched member Wb, WAb adjacent to each other in a boundary portion between two or more of the punched members Wa, WAa that are continuously laminated and two or more of the punched members Wb, WAb that are continuously laminated.

The laminated iron core 1, 1A is useful for reducing the influence of the plate thickness deviation and the shape change, similarly to the manufacturing method for the laminated iron core 1, 1A.

Here, a case where adjacent punched members W are connected to each other by application of an adhesive will be examined. A plurality of roll seams extending along an extending direction of the metal sheet MS are formed on an upper surface and a lower surface of the metal sheet MS formed by rolling. In this case, when a cross section of the metal sheet MS in a plane orthogonal to the extending direction is observed, convex portions and concave portions are alternately formed side by side by the plurality of roll seams on each of the upper surface and the lower surface of the metal sheet MS. When the rotational lamination is not performed, the two punched members W are laminated such that a convex portion formed on the lower surface of one punched member W is fitted into a concave portion formed on the upper surface of another punched member W, and a convex portion formed on the upper surface of the other punched member W is fitted into a concave portion formed on the lower surface of one punched member W.

When the rotational lamination is performed, the uneven shape formed due to the plurality of roll seams is not aligned between two punched members W, and a gap between the two punched members W is larger than when the rotational lamination is not performed. Assuming that the same amount of adhesive is applied, as the gap between two punched members W increases, a range in which the adhesive spreads along the main surface of the punched member W becomes narrower, and the fastening force between the punched members W becomes weaker. As described above, in the case where the application of the adhesive is adopted, when the rotational lamination angle is changed in the design change portion, in addition to the difference in processing strain due to the design change and the difference in plate thickness deviation trends due to the rotational lamination, the gap becomes large due to the orientation of the roll seam, and the fastening force of the adhesive decreases. As a result, cracks are more likely to occur in the design change portion. Therefore, when the application of the adhesive is adopted, it is more useful to manufacture a laminated iron core using the above-described manufacturing method.

The invention claimed is:

1. A manufacturing method for a laminated iron core, the manufacturing method comprising:
   a punching process of punching a metal sheet to form a plurality of punched members including a first punched member having a first shape and a second punched member having a second shape different from the first shape; and
   a laminating process of forming a laminated body by laminating the plurality of punched members while changing a rotational lamination angle each time one or more punched members are laminated, the rotational lamination angle representing an angle of the punched member in a circumferential direction,
   wherein in the laminating process, the plurality of punched members are laminated such that the rotational lamination angle is the same between the first punched member and the second punched member adjacent to each other in a boundary portion between two or more of the first punched members that are continuously laminated and two or more of the second punched members that are continuously laminated.

2. The manufacturing method according to claim 1,
   wherein the laminated body formed in the laminating process includes a plurality of member groups having different rotational lamination angles,
   wherein the plurality of member groups each include two or more punched members having the same rotational lamination angle, and
   wherein in the laminating process, the plurality of punched members are laminated such that a total lamination thickness is substantially the same among the plurality of member groups.

3. The manufacturing method according to claim 1,
   wherein the laminated iron core is a core for a stator, and
   wherein a shape of an outer edge of the punched member is different between the first shape and the second shape.

4. The manufacturing method according to claim 1,
   wherein the laminated iron core is a core for a rotor, and
   wherein the first shape and the second shape differ in at least one of a shape of an opening formed in the punched member and surrounding a central axis of the laminated iron core, and a shape of an outer edge of the punched member.

5. A laminated iron core, comprising:
   a laminated body formed by laminating a plurality of punched members including a first punched member having a first shape and a second punched member having a second shape different from the first shape,
   wherein the laminated body includes a plurality of blocks arranged in a lamination direction and each including one or more punched members, and
   wherein in the laminated body,
   a rotational lamination angle, which represents an angle of the punched member in a circumferential direction, is different between blocks adjacent to each other among the plurality of blocks, and
   the rotational lamination angle is the same between the first punched member and the second punched member adjacent to each other in a boundary portion between two or more of the first punched members that are continuously laminated and two or more of the second punched members that are continuously laminated.

6. The laminated iron core according to claim 5, wherein the laminated body includes a plurality of member groups having different rotational lamination angles, wherein the plurality of member groups each include two or more punched members having the same rotational lamination angle, and wherein a total lamination thickness is substantially the same among the plurality of member groups.

7. The laminated iron core according to claim 5, wherein the laminated iron core is a core for a stator, and wherein a shape of an outer edge of the punched member is different between the first shape and the second shape.

8. The laminated iron core according to claim 5, wherein the laminated iron core is a core for a rotor, and wherein the first shape and the second shape differ in at least one of a shape of an opening formed in the punched member and surrounding a central axis of the laminated iron core, and a shape of an outer edge of the punched member.

* * * * *